US012398054B2

(12) United States Patent
Tremblay-Meunier et al.

(10) Patent No.: US 12,398,054 B2
(45) Date of Patent: Aug. 26, 2025

(54) APPARATUS AND METHOD FOR DOSAGE AND ADMINISTRATION OF LIQUID CHEMICALS

(71) Applicant: MEUNIER TECHNOLOGIES INC., Saint-Eustache (CA)

(72) Inventors: Vincent Tremblay-Meunier, Saint-Eustache (CA); Jean-Christophe Fortin Houde, Pincourt (CA)

(*) Notice: Subject to any disclaimer, the term of this patent is extended or adjusted under 35 U.S.C. 154(b) by 594 days.

(21) Appl. No.: 17/692,866

(22) Filed: Mar. 11, 2022

(65) Prior Publication Data
US 2022/0194827 A1 Jun. 23, 2022

Related U.S. Application Data

(63) Continuation of application No. 16/647,771, filed as application No. PCT/CA2018/051183 on Sep. 21, 2018, now Pat. No. 11,306,011.
(Continued)

(51) Int. Cl.
*C02F 1/68* (2023.01)
*C02F 1/00* (2023.01)
(Continued)

(52) U.S. Cl.
CPC .............. *C02F 1/686* (2013.01); *C02F 1/008* (2013.01); *G01F 11/28* (2013.01);
(Continued)

(58) Field of Classification Search
None
See application file for complete search history.

(56) References Cited

U.S. PATENT DOCUMENTS 4,254,797 A 3/1981 Mayeaux
4,714,091 A 12/1987 Wagner
(Continued)

FOREIGN PATENT DOCUMENTS

CA 1096353 A 2/1981
CN 102573999 A 7/2012
(Continued)

OTHER PUBLICATIONS

Corresponding Chinese patent application No. 201880062240.0 Office Action dated Dec. 6, 2023 (Google translation provided).
(Continued)

*Primary Examiner* — Richard C Gurtowski
(74) *Attorney, Agent, or Firm* — Anglehart et al.

(57) ABSTRACT

A channel block for a liquid chemical dosing apparatus. The channel block has a process outlet; a chemical liquid inlet; an evacuation outlet; a calibration column outlet; channels provided within the channel block that connect at least the process outlet, the chemical liquid inlet, the evacuation outlet and the calibration column outlet; a pressure indicator mounted to the channel block to measure the pressure of the chemical liquid entering through the chemical liquid inlet; a additional regulation valve mounted to the channel block upstream of at least one of the process outlet and the calibration column outlet; a evacuation regulation valve mounted to the channel block upstream of the evacuation outlet; at least three control valves mounted to the block configured to control the chemical liquid passing through the channels.

18 Claims, 15 Drawing Sheets

Related U.S. Application Data

(60) Provisional application No. 62/678,660, filed on May 31, 2018, provisional application No. 62/653,234, filed on Apr. 5, 2018, provisional application No. 62/648,128, filed on Mar. 26, 2018, provisional application No. 62/562,615, filed on Sep. 25, 2017, provisional application No. 62/562,630, filed on Sep. 25, 2017.

(51) Int. Cl.
   *G01F 11/28*     (2006.01)
   *G01F 25/00*     (2022.01)
   *G05D 7/06*      (2006.01)
   *G05D 16/06*     (2006.01)

(52) U.S. Cl.
   CPC ....... *G01F 25/0092* (2013.01); *G05D 7/0652* (2013.01); *G05D 16/063* (2013.01); *C02F 2201/005* (2013.01); *C02F 2209/03* (2013.01)

(56) References Cited

U.S. PATENT DOCUMENTS

| | | | |
|---|---|---|---|
| 4,763,494 | A | 8/1988 | Der Kinderen |
| 5,662,143 | A | 9/1997 | Caughran |
| 5,836,355 | A | 11/1998 | Markulec et al. |
| 5,860,676 | A | 1/1999 | Brzezicki et al. |
| 5,954,527 | A | 9/1999 | Jhuboo et al. |
| 6,123,340 | A | 9/2000 | Sprafka et al. |
| 6,136,196 | A | 10/2000 | Weinberger |
| 6,228,255 | B1 | 5/2001 | Peterson et al. |
| 6,415,822 | B1 | 7/2002 | Hollingshead |
| 6,495,103 | B2 | 12/2002 | Hettinger |
| 6,729,353 | B2 | 5/2004 | Nguyen |
| 6,780,064 | B2 | 8/2004 | Abel et al. |
| 7,089,778 | B2 | 8/2006 | Rabenecker et al. |
| 7,294,262 | B2 | 11/2007 | Tadlock |
| 7,530,255 | B2 | 5/2009 | Frank et al. |
| 8,186,441 | B2 | 5/2012 | Donohue et al. |
| 8,950,433 | B2 | 2/2015 | Manofsky, Jr. et al. |
| 2005/0028878 | A1 | 2/2005 | Reid, II et al. |
| 2007/0292285 | A1* | 12/2007 | Reynolds ................ F04B 9/125 417/397 |
| 2008/0210620 | A1* | 9/2008 | Madsen ................ B01D 29/46 210/416.1 |
| 2008/0271800 | A1 | 11/2008 | Curran et al. |
| 2008/0302426 | A1 | 12/2008 | Mulligan et al. |
| 2009/0127176 | A1 | 5/2009 | Cummins |
| 2013/0098818 | A1 | 4/2013 | Beath |
| 2014/0010734 | A1 | 1/2014 | Ludwg |
| 2014/0030418 | A1 | 1/2014 | Reust et al. |
| 2014/0090731 | A1 | 4/2014 | Hannah et al. |
| 2015/0071802 | A1 | 3/2015 | Goldbrunner et al. |
| 2015/0368137 | A1 | 12/2015 | Miller et al. |
| 2016/0289110 | A1 | 10/2016 | Oh et al. |

FOREIGN PATENT DOCUMENTS

| | | |
|---|---|---|
| CN | 104350318 A | 2/2015 |
| CN | 206126876 A | 4/2017 |

OTHER PUBLICATIONS

European application No. EP18857630.0, the extended European search report dated Mar. 26, 2021.
European application No. EP18857630.0, the examation report dated Feb. 25, 2022.
International application No. PCT/CA2018/051183 International Preliminary Report on Patentability Chapter II dated Dec. 30, 2020.
International application No. PCT/CA2018/051183 Written Opinion of the International Searching Authority dated Jan. 18, 2019.
International application No. PCT/CA2018/051183 International Search Report dated Jan. 18, 2019.
International application No. PCT/CA2018/051183 Search Strategy dated Jan. 18, 2019.
Corresponding Canadian patent application No. 3,075,945 examination report dated Mar. 4, 2024.
Corresponding European patent application No. 18857630.0 Communication under Rule 71(3) EPC (Intention to grant) dated Mar. 25, 2024.
Corresponding Australian patent application No. 2018336080, the examation report dated May 31, 2024.
Examination report dated Jul. 3, 2025 (Jul. 3, 2025) in the corresponding Canadian patent application No. 3,075,945.

* cited by examiner

APPARATUS AND METHOD FOR DOSAGE AND ADMINISTRATION OF LIQUID CHEMICALS

CROSS-REFERENCE TO RELATED APPLICATIONS

The present application is a continuation application of U.S. patent application Ser. No. 16/647,771 which entered national phase on Mar. 16, 2020, now allowed, which, in turn, is a 371 application of International PCT application No. PCT/CA2018/051183 filed on Sep. 21, 2018, that claims priority of U.S. provisional patent application No. 62/562,615 filed on Sep. 25, 2017; U.S. provisional patent application No. 62/562,630 filed on Sep. 25, 2017; U.S. provisional patent application No. 62/648,128 filed on Mar. 26, 2018; U.S. provisional patent application No. 62/653,234 filed on Apr. 5, 2018; and U.S. provisional patent application No. 62/678,660 filed on May 31, 2018; the specifications of the five provisional applications are hereby incorporated by reference.

TECHNICAL FIELD

The present application relates to the field of liquid chemical dosing.

BACKGROUND

Traditional chemical delivery systems for water treatment are built from pipes or tubes that are assembled together to form the system. The different components of the chemical system are built in and connected to the pipes, such as the pressure gauge and the valves.

The assembly of the piping system can require considerable labour and can be costly due to the extent of the parts required. Moreover, due to the number of joints and connections between the different components of the system, as the different pipes are connected to one another, this multiplies the risks tied to leakage from the joints and connectors between the pipe parts. This is emphasized by the damaging nature of the chemicals that are transported in the pipes, which can result in leakage over time, especially when some of the joints may be poorly joined together (e.g. poorly welded, or the polymer material used breaks down over time when exposed to the chemical(s) that is/are being carried through the pipes). For instance, threaded connections may be an important source of leakage. A leakage can pose a serious risk to workers due to the toxic and noxious nature of certain of the chemicals used for water treatment. Additionally, system failure can have a dramatic repercussion in drinking water treatment applications. It can also create unexpected downtime which may be costly to repair.

Moreover, the continuous vibration of the piping and tubing causes mechanical fatigue that may lead to leakage and failure. The frequency and the intensity of this vibration may be dictated by the type of dosing/metering pump used and their operating condition. Examples of pump technology include diaphragm, piston, peristaltic, progressive cavity, gear, etc.

Furthermore, different chemical dosing systems where the pathways of the system are provided in modular blocks are known.

SUMMARY

There currently exists an important need for a durable and reliable chemical dosage apparatus for water treatment. Furthermore, the increasing footprint cost in the water and wastewater treatment plants requires for smaller systems. The apparatus would also require a means to evacuate trapped gas which may result in complications during the chemical dosage, such as chemical crystallization and to the condition of pump gas locking. Moreover, an apparatus that reduces the number of connections between the different components, where the system provides for a shorter fluid path and a simple chemical passage geometry, would be advantageous.

A broad aspect is a channel block adapted for a chemical dosage apparatus. The channel block includes ports includes one or more inlets and one or more outlets, wherein the one or more inlets includes a liquid chemical inlet, and wherein the one or more outlets includes a process outlet. The channel block has channels integrated within the channel block, for passing a chemical liquid, connecting the ports. The channel block includes a ball valve mounted to the channel block for controlling the passage of chemical liquid through at least one of the channels. The ball valve includes a ball with an aperture to allow passage of a chemical liquid; a carrier adapted to restrict the rotational movement of the ball; two ball seats for maintaining a seal surface around the ball; a handle; a stem connected to the handle adapted to transfer torque from the handle to the ball; and a housing configured to receive and house the ball, the two ball seats and the entire carrier, and dimensioned so that a portion of the housing extends beyond the housed carrier. The ball, the housing, the carrier and the two ball seats are within the channel block, and the portion of the housing that extends beyond the housed carrier is adapted to receive at least a part of a connector that connects the channel block to an external component, wherein the connector receivable within the housing is received within the channel block.

In some embodiments, the one or more outlets may have an evacuation outlet.

In some embodiments, the one or more outlets may have a calibration column outlet.

In some embodiments, the channel block may have a calibration column connected to the calibration column outlet.

In some embodiments, the channel block may be composed of two or more sub-blocks.

In some embodiments, the channel block may a pressure indicator configured to measure the pressure of the chemical liquid entering the channel block from the liquid chemical inlet. In some embodiments, the pressure indicator may be a pressure gauge.

In some embodiments, the channel block may include the connector. In some embodiments, the connector may protrude from a surface of the channel block. In some embodiments, one extremity of the connector may be flush with a surface of the channel block. In some embodiments, a first extremity of the connector, opposite to a second extremity of the connector that is in contact with the carrier, may be sunken with respect to a surface of the channel block surrounding the connector.

A broad aspect is a chemical dosage apparatus. The apparatus includes a channel block including ports including at least one inlet and at least one outlet, wherein the at least one inlet comprises a liquid chemical inlet, and wherein the at least one outlet comprises a process outlet. The channel block includes channels integrated within the channel block, for passing a chemical liquid, connecting the ports. The apparatus includes a pump at least partially integrated into the channel block, for pumping a chemical liquid directly into the channel block.

In some embodiments, the chemical liquid may flow from the pump into at least one channel of the channels of the channel block. The chemical liquid may flow from the pump into the at least one channel of the channels without passing through a conduit positioned between the pump and the channel block.

In some embodiments, the apparatus may include a pump mounting to secure the pump to a support surface, wherein the pump, secured to the support surface, may support the channel block that is mounted thereon. In some embodiments, the pump may support entirely the channel block.

In some embodiments, the apparatus may include a channel block mounting for mounting the channel block to a vertical surface, wherein the channel block is supported by at least the channel block mounting.

In some embodiments, the pump mounting may be configured to secure the pump to a vertical support surface.

In some embodiments, the at least one outlet may include a calibration column outlet, and the apparatus may include a calibration column connected to the calibration column outlet.

In some embodiments, the channel block may include at least one regulation valve to regulate the pressure of the chemical liquid flowing through the channel block. In some embodiments, the at least one regulation valve may include a diaphragm valve.

In some embodiments, the channel block may have at least one control valve with a closed position and an opened position, wherein the at least one control valve may be mounted to the channel block such that the chemical liquid may flow through a channel of the channels when a control valve of the at least one control valve is in the opened position, and the chemical liquid is prevented from flowing through the channel of the channels when the control valve of the at least one control valve is in the closed position.

In some embodiments, the channel block may include a pressure indicator mounted to the channel block in proximity of the chemical inlet, wherein the pressure indicator may be configured to measure pressure of the chemical liquid entering the chemical inlet.

In some embodiments, the chemical inlet may be located on a bottom surface of the channel block.

In some embodiments, the at least one outlet further may have an evacuation outlet.

In some embodiments, the channel block may be composed of two or more sub-blocks.

In some embodiments, the at least one outlet may include a calibration column outlet. The apparatus may include a calibration column connected to the calibration column outlet.

In some embodiments, the pump may be a diaphragm pump.

In some embodiments, the diaphragm pump may include a pump diaphragm and an actuating rod connected to the pump diaphragm. The pump diaphragm and the actuating rod may be at least partially integrated into the channel block.

In some embodiments, the channel block may include one or more control valves positioned to regulate the chemical liquid entering from the liquid chemical inlet.

In some embodiments, the channel block may include one or more control valves positioned to regulate the chemical liquid flowing in a channel positioned that directly or indirectly connects the integrated pump to the process outlet.

A broad aspect is a channel block for a liquid chemical dosing apparatus. In some examples, the liquid chemical dosing apparatus is for water treatment. However, it will be understood that the chemical dosing apparatus may be that for other utilities requiring chemical dosing. The channel block has an upper surface and a bottom surface opposite to the upper surface, a front surface, and a rear surface opposite to the front surface, wherein the front surface is orthogonal to the upper surface. The channel block includes a process outlet positioned to allow the discharge of a chemical liquid from the channel block travelling towards a delivery point of the chemical liquid. The channel block includes a chemical liquid inlet configured to receive the chemical liquid travelling into the channel block. The channel block includes an evacuation outlet positioned for evacuating excess chemical liquid in channels of the channel block. The channel block includes a calibration column outlet configured to connect to a calibration column. The channel block includes channels provided within the channel block that connect at least the process outlet, the chemical liquid inlet, the evacuation outlet and the calibration column outlet. The channel block includes a pressure indicator mounted to the channel block to measure the pressure of the chemical liquid entering through the chemical liquid inlet. The channel block includes a evacuation regulation valve mounted to the channel block upstream of the evacuation outlet, and interacting with the channels to control passage of the chemical liquid through a channel of the channels connecting the chemical liquid inlet to the evacuation outlet. The channel block includes at least three control valves mounted to the block configured to control the chemical liquid passing through the channels, wherein a first control valve of the at least three control valves is situated with respect to the channels to control the flow of the chemical liquid to the process outlet, wherein a second control valve of the at least three control valves is situated with respect to the channels to control the flow of the chemical liquid to the evacuation outlet; and a third control valve of the at least three control valves is situated with respect to the channels to control the flow of the chemical liquid to the calibration column outlet. The additional regulation valve is positioned with respect to the first control valve, second control valve and third control valve such that a pressure set point of the additional regulation valve may be calibrated using the pressure indicator when the first control valve is in an open position, and the second control valve and the third control valve are in a closed position, and/or the third control valve is in an open position, and the first control valve and the second control valve are in a closed position.

In some embodiments, the channel block may include an additional regulation valve mounted to the channel block upstream of at least one of the process outlet and the calibration column outlet, and interacting with the channels to control passage of the chemical liquid through a channel of the channels connecting the chemical liquid inlet to the process outlet. The additional regulation valve is positioned with respect to the first control valve, second control valve and third control valve such that a pressure set point of the additional regulation valve may be calibrated using the pressure indicator when the first control valve is in an open position, and the second control valve and the third control valve are in a closed position, and/or the third control valve is in an open position, and the first control valve and the second control valve are in a closed position.

In some embodiments, the at least three control valves may consist of three control valves.

In some embodiments, the at least three control valves may include ball valves.

In some embodiments, the pressure indicator may be positioned in proximity of the liquid chemical inlet.

In some embodiments, the at least three control valves may be ball valves.

In some embodiments, the channel block may have an auxiliary port, and wherein the channels may connect at least the process outlet, the chemical liquid inlet, the evacuation outlet, the calibration column outlet and the auxiliary port.

In some embodiments, the additional regulation valve may be a back-pressure valve.

In some embodiments, the evacuation regulation valve may be a pressure relief valve.

In some embodiments, the additional regulation valve may be a diaphragm valve.

In some embodiments, the evacuation regulation valve may be a diaphragm valve.

In some embodiments, the pressure indicator may be a pressure gauge.

In some embodiments, the evacuation regulation valve may be positioned with respect to the three control valves such that a pressure set point of the evacuation regulation valve may be calibrated using the pressure indicator when the first control valve, the second control valve and the third control valve are in a closed position.

In some embodiments, the process outlet may be located on the upper surface.

In some embodiments, the liquid chemical inlet may be located on a surface of the channel block other than a surface of the channel block on which the process outlet is located.

In some embodiments, the rear surface further may include a mounting to secure the channel block to a vertical surface.

In some embodiments, the at least three control valves, the additional regulation valve and the evacuation regulation valve may be positioned on the front surface.

In some embodiments, the channel block may be composed of at least two sub-blocks.

A second aspect is a water treatment chemical liquid dosing apparatus. The water treatment chemical liquid dosing apparatus has the channel block as defined herein, and a calibration column connected to the calibration column outlet of the channel block.

A broad aspect is a method of treating water. The method includes pumping chemical liquid from a source of the chemical liquid. The method includes receiving the chemical liquid at a liquid chemical inlet of a channel block so that the chemical liquid flows within channels defined within the channel block. The method includes regulating the pressure of the chemical liquid flowing in the channels of the channel block so that the pressure is set at a desired pressure. The method includes outflowing a dosed amount of the chemical liquid at the desired pressure towards a body of water that requires treatment. The method includes treating the water with the chemical liquid.

In some embodiments, the regulating may be performed by a back-pressure valve of the channel block.

In some embodiments, the method may include, prior to the pumping, calibrating the back-pressure valve by using a pressure indicator of the channel block located at the chemical liquid by measuring the pressure of the chemical liquid entering the chemical inlet.

In some embodiments, the method may include cleaning the channels of the channel block by using an auxiliary port of the channel block.

BRIEF DESCRIPTION OF THE DRAWINGS

The invention will be better understood by way of the following detailed description of embodiments of the invention with reference to the appended drawings, in which.

DETAILED DESCRIPTION

The present application relates to a channel block, tailored for the purposes of chemical dosing for water treatment, having internally channels adapted to receive and direct chemicals between different inlets and outlets of the channel block. The channel network contained with the channel block provides for a mechanism to direct the chemicals while reducing the risks of chemical leakage. The configuration of the channels may vary depending upon the desired passage of the chemical liquid, or the configuration of the channel block (e.g. number of ports; number of components, etc.) The different valves for directing and controlling the flow of chemicals within the channels of the channel block are directly mounted onto the channel block.

The channel block is configured to allow for the passage of a liquid therein (e.g. chemical liquid). It will be understood, however, that even though the channel block is configured to transport liquid, some gases may be found in the channel block (e.g. as a result of chemical reactions, chemical breakdown, etc.), and require evacuation as explained herein. Moreover, some of the chemical liquid may also solidify (e.g. crystallize) in the channels or in the channel block, requiring cleaning of the channel block.

Definitions

In the present application, by "process outlet" it is meant an outlet to allow for chemical liquid to travel out from the channel block towards a delivery point for the chemical liquid, such as a body of water that is to be treated (e.g. water tank, water basin), a processing unit for the chemical liquid, etc.

In the present application, by "evacuation outlet" it is meant an outlet to evacuate chemical liquid that is in the channel block, such as when the pressure of the chemical liquid is too high, and the chemical liquid flows, for example, through the pressure-relief valve, or when the calibration column is being emptied, etc.

In the present application, by "chemical inlet" it is meant the entry point of the chemical liquid into the channel block, for instance, that is being pumped by a pump from a source of the chemical liquid.

In the present application, by "calibration column outlet" it is meant an outlet that allows the chemical liquid to enter and/or exit the calibration column from and/or into the channel block.

Figure 1A:
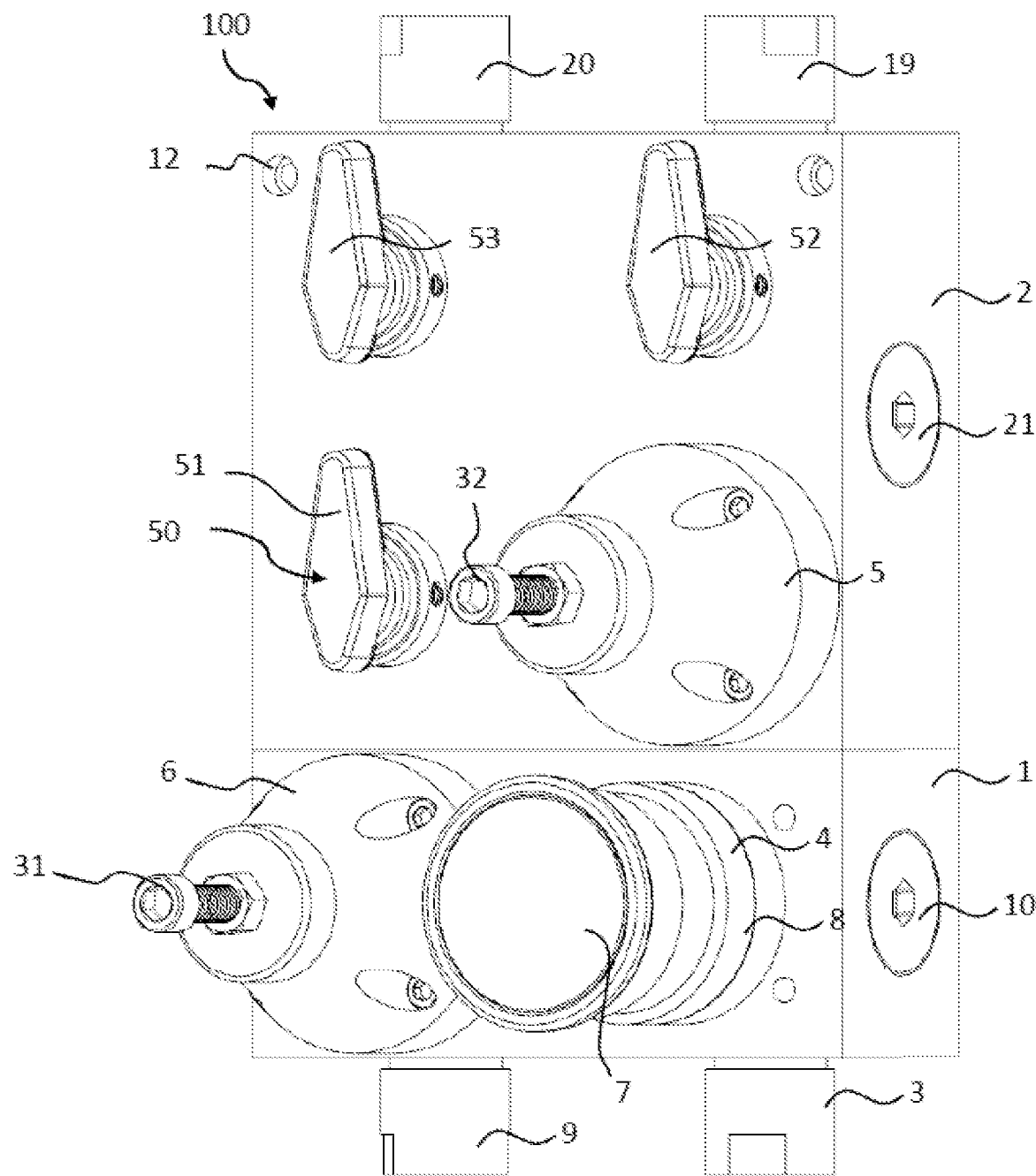
FIG. 1A is a drawing of a front-oblique view of an exemplary chemical dosing channel block.
Figure 1B:
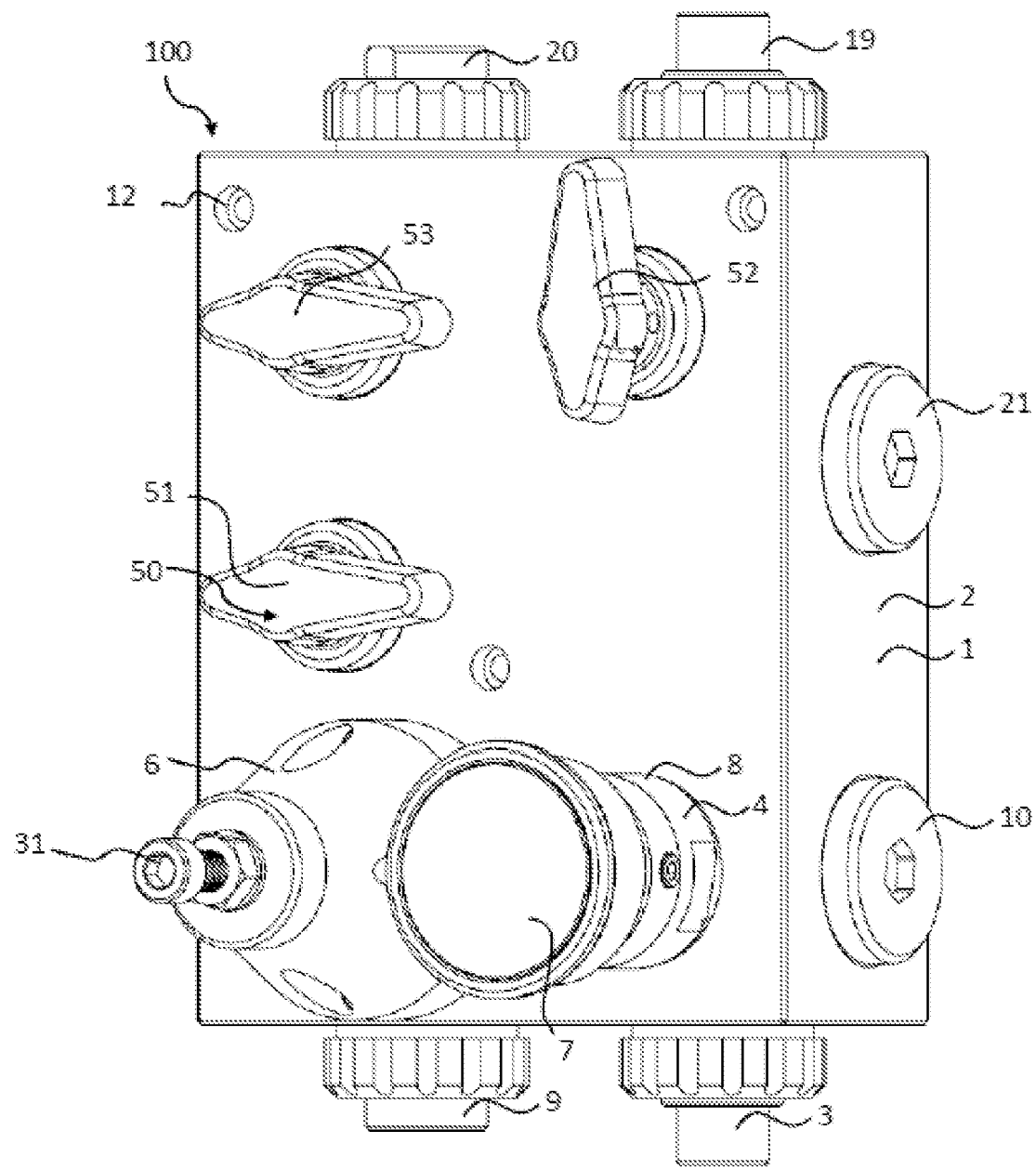
FIG. 1B is a drawing of a front-oblique view of another exemplary chemical dosing channel block.

Channel Block:

Reference is made to FIG. 1A illustrating an exemplary chemical dosing channel block 100. For the purposes of illustration, in FIG. 1A, channel block 100 is shown as being two modular blocks 1 and 2. However, channel block 100 may be one single block as shown in FIG. 1B. Moreover, in some examples, channel block 100 may be composed of a plurality of modular blocks, where each of the blocks is configured to join with another in order to form a composite channel block. Additionally, the configuration, and the geometry of the modular block(s) can vary depending on the application and the integrated features.

Exemplary channel block 100 has one lower block 1 with four connecting ports, an integrated valve 6 and a top interface to be assembled with an upper block 2. In some examples, integrated valve 6 (also defined as a regulation valve 6) is a diaphragm valve. In some examples, integrated 6 is a pressure relief valve.

Channel block 100 also has one upper block 2 with three connecting ports, three integrated ball valves. In some examples, channel block 100 may have an integrated valve 5 (also defined as a regulation valve 5) and a lower interface to be assembled with the lower block 1 (in the example where channel block 100 is composed of more than one modular block). In some examples, integrated valve 5 is a diaphragm valve. In some examples, integrated valve 5 is a back-pressure valve.

In some examples, the pump may regulate the pressure entering the chemical inlet port, so there may be any need for an integrated valve 5.

Lower Block 1:

The lower block 1 may have a number of ports configured to act as inputs and outputs, connected to the channels of the lower block 1. For instance, the lower block 1 has three ports. In this example, port 3 is the chemical inlet which is directly connected to the dosing pump discharge line. The port 4 can be used to connect with a pressure indicator to measure the pressure of the chemicals flowing in the channel to which it is connected. In some examples, the pressure indicator 7 is positioned in proximity integrated valve 5 and integrated valve 6, where the pressure reading allows the operator to adjust the set point of the diaphragm valves 5 and/or 6. In some examples, the pressure indicator 7 is a pressure gauge with an isolator 8. It will be understood that other pressure indicators may be used.

In this example, the port 9 (evacuation outlet) serves as a tank return port for the pressure relief valve 6 outlet and the upper block/calibration column drainage. In some examples, a same port may be used as a chemical inlet for receiving chemical into the channel block 100, and an outlet to drain chemical from the channel block 100.

In some examples, the port 10 can serve as an auxiliary port where a variety of components can be connected and installed thereto, such as, e.g., a pressure transmitter. In some examples, port 10 can also be used as a cleaning port. In some examples, the top surface of the lower block 1 is mountable to the lower face of the upper block 2. In one example, the two blocks 1 and 2 are assembled with mounting screws and aligned with at least two dowel pins. It will be understood that other mechanisms to assemble blocks 1 and 2 may be used without departing from the present teachings.

The lower block 1 has located within channels 11 to allow the communication/passage of the fluid between the ports and the components.

Upper Block 2:

In some examples, the upper block may be equipped with mounting holes 12 that allow the module to be installed vertically to, for instance, a panel, wall or any other plane surface.

In some examples, the upper block 2 has three ball valves. It will be understood that upper block 2 may have more or less valves depending on the desired flow and control of the passage of chemicals therein. In some examples, each of the three ball valves may have a housing with, in some examples, sub-housings 13 that are directly integrated inside the block. The bottom portion 14 may serve as guide for the seat 25, the middle portion 15 is the ball valve chamber where the ball 23 has room to rotate and the top portion 16 is threaded for the carrier and connector to be screwed in. The block 2 may also feature a hole 17 adapted to receive a stem 27, and a groove 18 to guide movement of the valve handle 28. The ports 19 and 20 can either be used as an outlet (to process) port or for the bottom mount of the calibration column 110.

In some examples, upper block 2 may have a port 21 that may serve as an auxiliary port to which, e.g., a variety of components can be installed such as: a pulsation dampener, pressure indicator, pressure transmitter, etc. In some examples, port 21 can also be used as a cleaning port. The upper block has channels 22. The channels 22 are located inside the block and allow the communication/passage of the fluids between the ports and the components.

Figure 4:
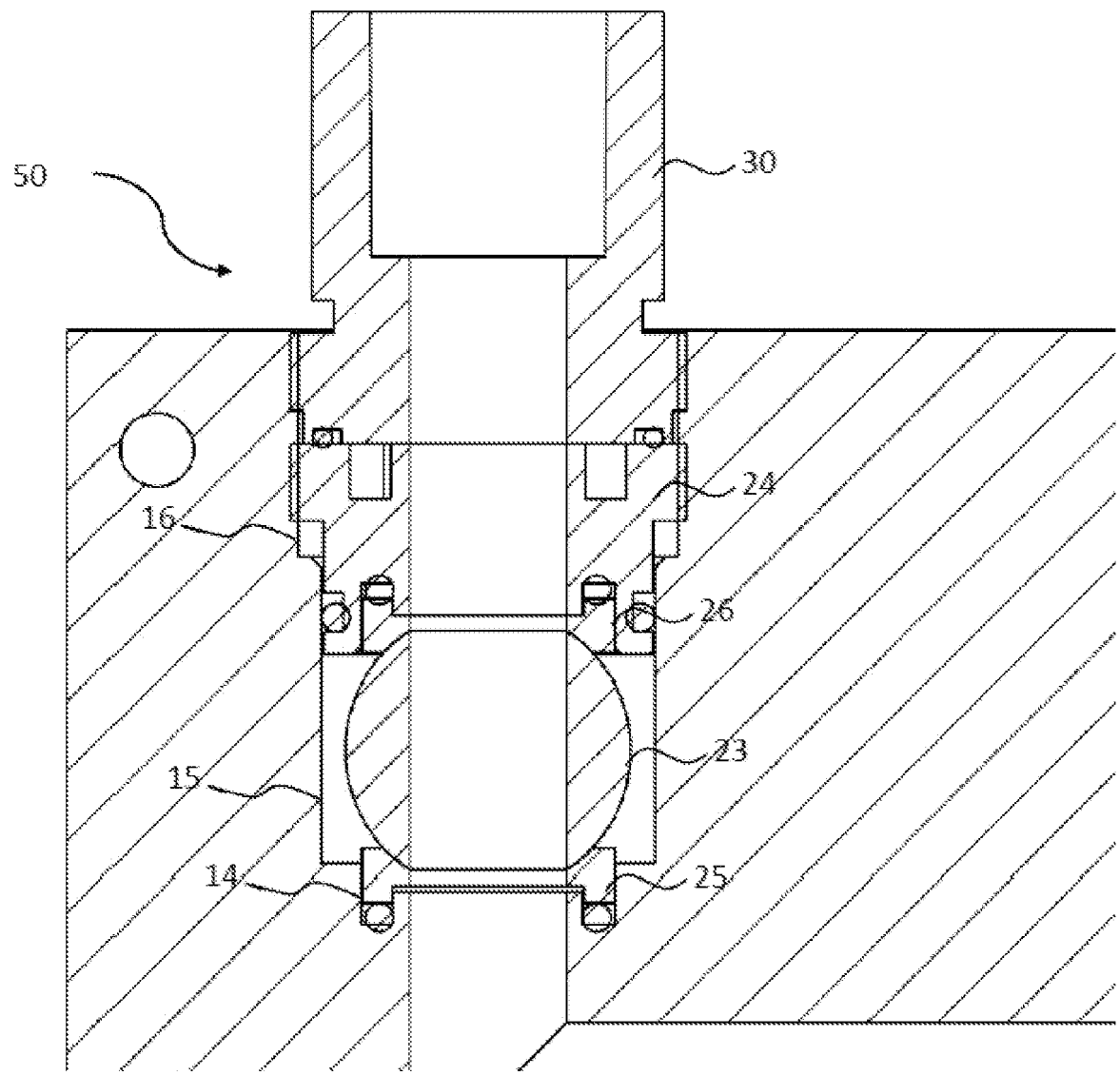
FIG. 4 is a drawing of cross-sectional front view of an exemplary ball valve of an exemplary chemical dosing channel block.
Figure 5:
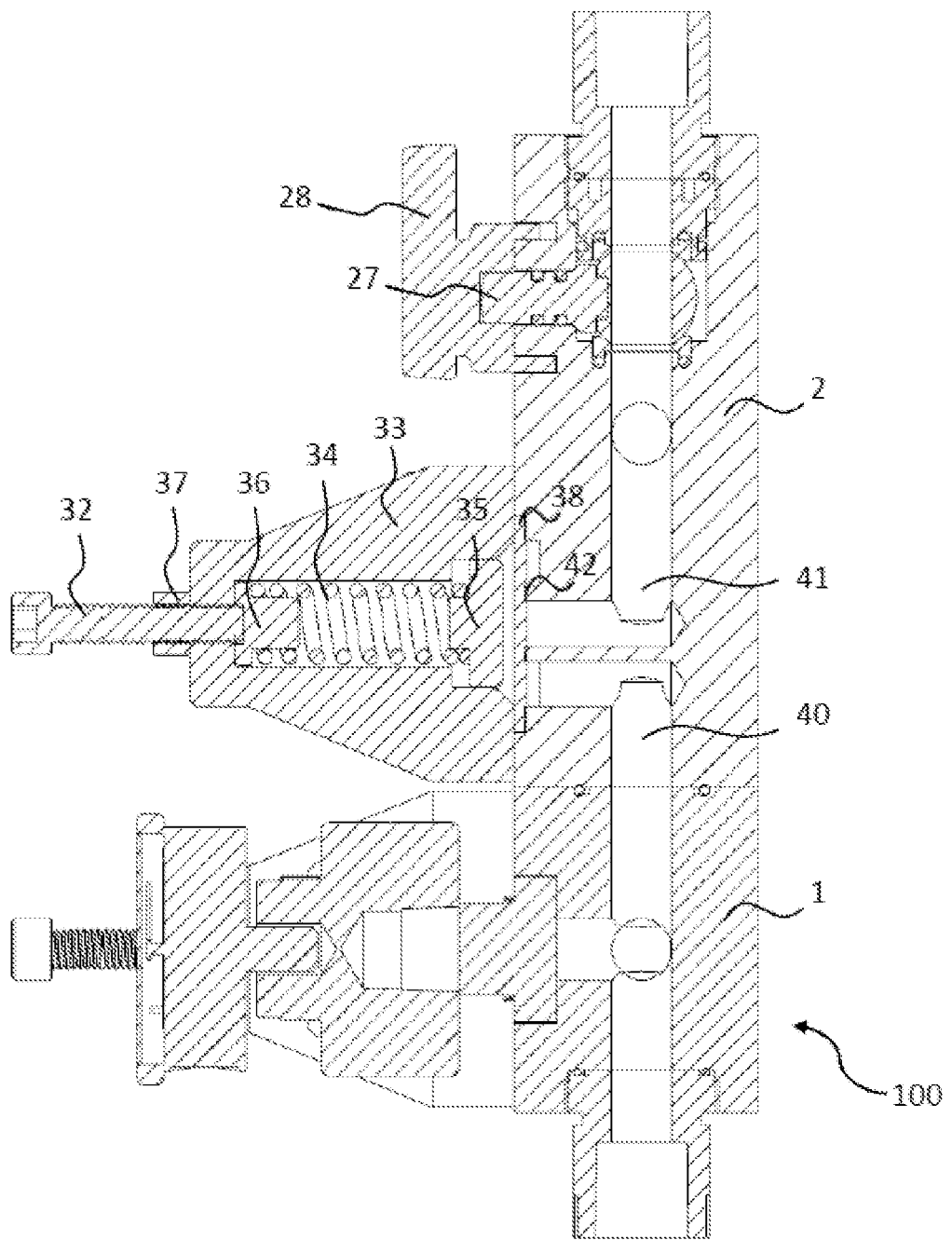
FIG. 5 is a drawing of cross-sectional side view of an exemplary chemical dosing channel block.

Ball Valves:

Reference is made to FIGS. 4 and 5 illustrating an exemplary ball valve of a channel block 100.

The exemplary ball valve 50, a control valve, is composed of a ball 23, a carrier 24, two seats 25 and 26, a stem 27 and a handle 28. The ball 23 is spherical with a hole at its center to allow the passage of fluid and with a groove on one side to be driven by the stem 27. The transition from an open to a closed ball valve position (and the opposite) can be attained by rotating the ball 23. The stem 27 is responsible for transferring the torque of the handle 28, induced by the operator, to the ball inside the block 2. The handle 28 is limited in its rotation by the groove 18 located on the block face. The two valve seats 25 and 26 are responsible for maintaining a sealed surface around the ball 23. The seat 25 is located at the bottom of the ball valve housing 13 inside the block 2. The seat 26 is located in the carrier 24. The purpose of the carrier 24 is to create a pressure between the ball 23 and the two seats 25 and 26, squeezing the ball 23 in place and constraining its translational movement. This pressure also allows the seal to be made between the ball 23 and the two seats 25 and 26. The threaded portion of the carrier 24 is screwed inside the upper portion of the ball valve housing 16 on the block 2. The end connector 30 will also be screwed on the top portion of the valve housing. One end will be seated on the carrier 24 and the other will be connected either directly to an instrument or to a piping/tubing. The type of connector can vary from a flanged connection, threaded connection, welded connection, etc.

In some examples, the connector 30 may be protruding from a surface of the channel block 100, as is shown in FIGS. 4 and 5. However, in other embodiments, the connector may be flush with a surface of the channel block, where, for instance, a sealer (e.g.; a seal ring; an 0 ring) may be used to seal off the connection between the connector and an external component (e.g. another channel block; an instrument; piping or tubing, etc.), creating a watertight and/or airtight seal. In some examples, the connector may be sunken with respect to the surface of the channel block 100, where the connecting portion of the external component is configured to join within the connector within the channel block 100.

In some embodiments, the connector 30 is part of the external component, where the connector 30 of the external component is configured to fit at least partially within the valve housing and connect with the channel block 100.

Pressure Relief/Back Pressure/Diaphragm Valve/Pressure Regulating Valve:

The channel block 100 may have two integrated valves 5 and 6. In some examples, as shown in FIG. 1B, the channel block 100 has only integrated valve 6. It will be understood that the number of diaphragm valves of channel block 100 may vary depending on the configuration, purposes and the channel formation of channel block 100.

The integrated valve 5 of exemplary channel block 100 operates as a back-pressure valve. Integrated valve 5 maintains a certain set pressure on the pump discharge line (e.g. connected to pump 120) and the lower block inlet port 3 during normal operation. Maintaining a constant pump discharge pressure allows for a better flow precision. It will be understood that volumetric pumps may generate a slightly different flow depending on the suction and discharge pressure for a given pumping set point. By fixing the discharge pressure, the variation may be limited, allowing for better precision. The integrated valve 6 may be a pressure relief valve. Integrated valve 6 may be configured to evacuate the pump liquid coming from the pump discharge line into the lower block inlet port 3 to limit the inlet pressure in a condition that the fluid can no longer flow through one of the possible exists 19 and 20. Integrated valve 6 may serve as a safety feature to protect the system from a failure caused by excessive pressure.

Reference is made to FIG. 5 illustrating an exemplary integrated valve 5 configured as a back-pressure valve (or an integrated valve 6 configured as a pressure-relief valve). Integrated valve 5 may have a bolt or knob (31 or 32) that can be adjusted (e.g. tightened or loosened) to set its pressure set point. Exemplary integrated valve 5 may have an upper assembly including an upper body/bonnet 33, a spring 34, a lower spring seat 35, an upper spring seat 36, an adjusting screw 32 with locking nut 37 and a diaphragm 38. The upper assembly of integrated valve 5 may be configured to mount directly to the blocks 1 and 2. The fluid passages 40 and 41 delimited by the diaphragm seat 42 may be integrated to one the blocks (e.g. block 1 and/or block 2).

The pressure set point of the integrated valve 5 will be adjusted and fixed by screwing and unscrewing the adjustment screw 32 into the threads of the upper body 33 threads. As a result, the adjustment screw 32 constrains via the upper seat 36 the spring 34 into a compressed position. The compressed spring 34 applies a force on the lower spring seat 35 that is transmitted on the diaphragm 38 which is seated on the diaphragm seat 42. In order to lift the diaphragm 38, the fluid has to create sufficient pressure to exceed the pressure applied by the lower spring seat 35. By lifting the diaphragm 38, fluid is then able to pass from the valve inlet channel 40 to the valve outlet channel 41. The diaphragm 38 is compressed on its peripheral by the assembly of the upper body 33 and the block 2 which creates a seal.

Figure 2:
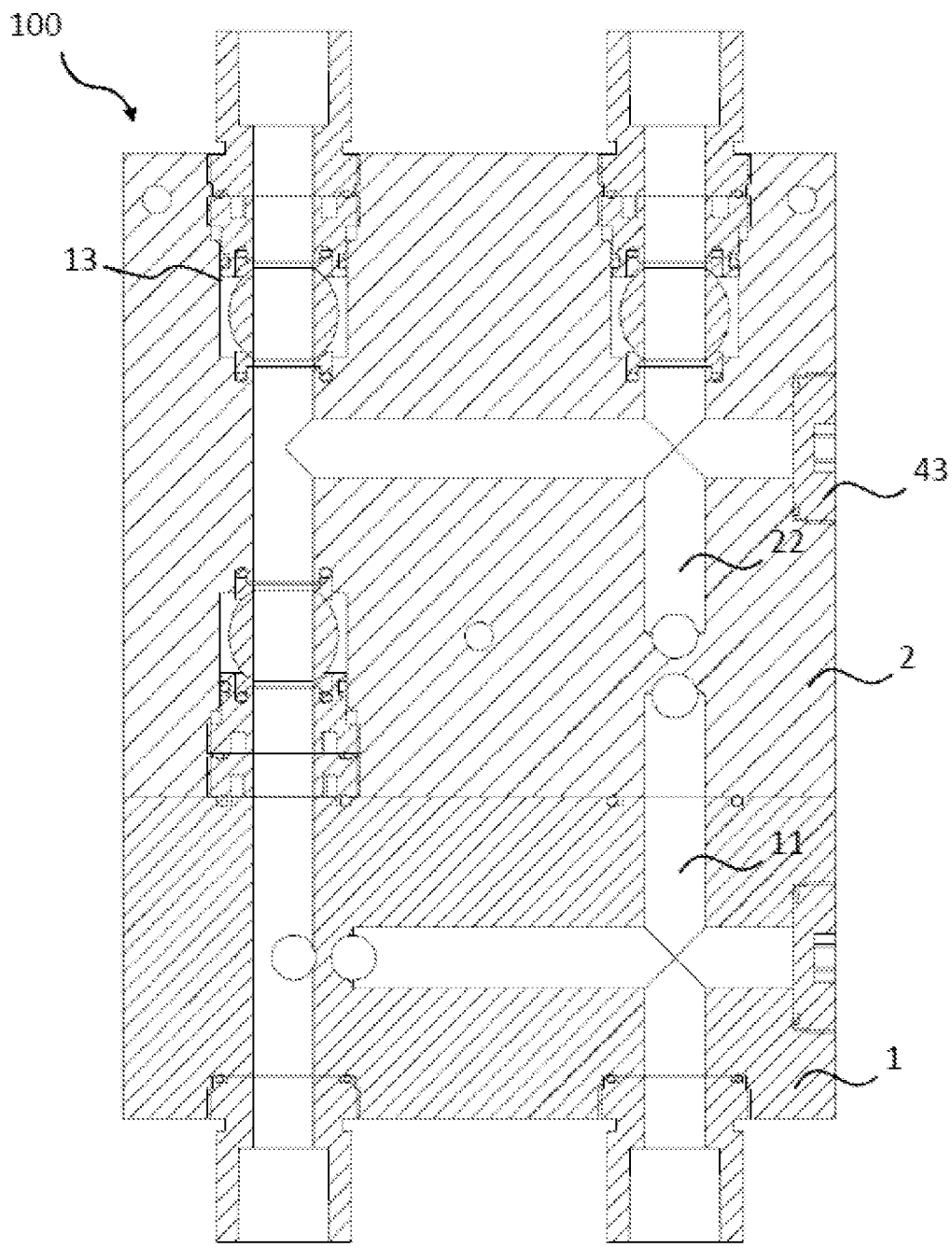
FIG. 2 is a drawing of a front cross-sectional view of an exemplary chemical dosing channel block.
Figure 3:
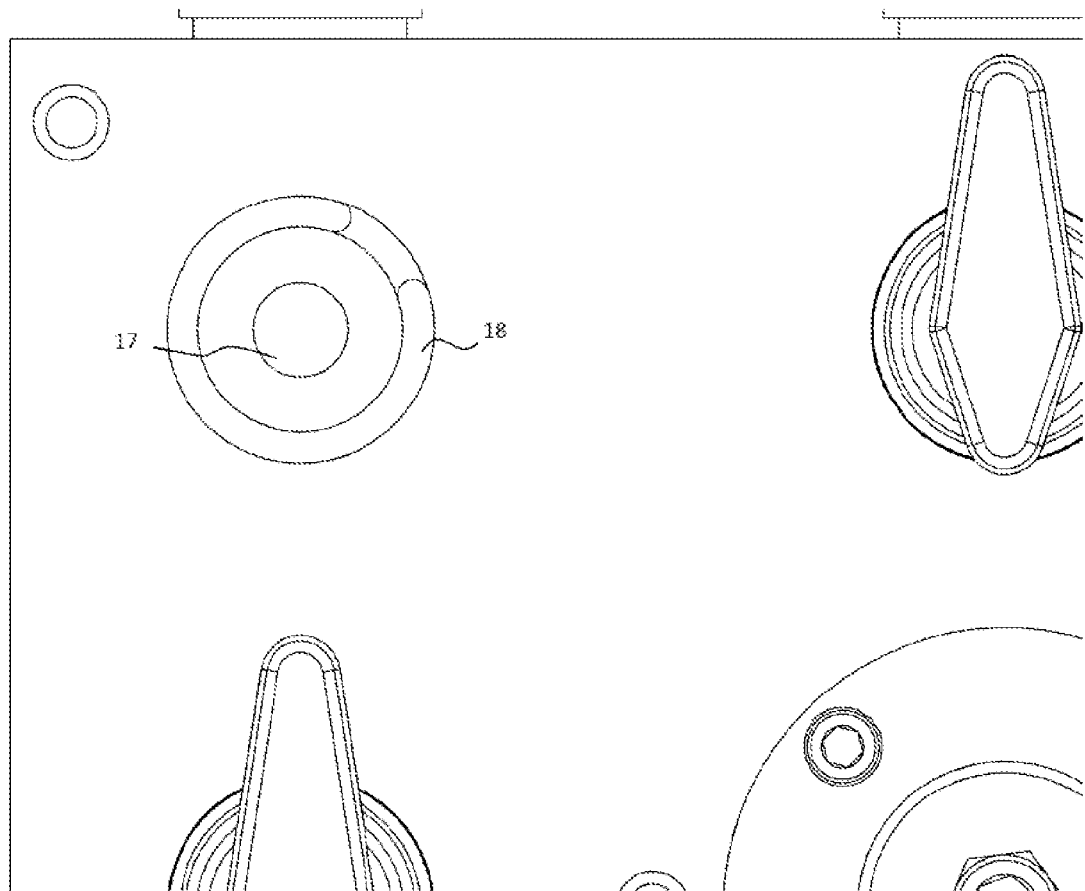
FIG. 3 is a drawing of a close-up front view of an exemplary chemical dosing channel block showing an exemplary opening and an exemplary groove to receive an exemplary a stem and handle of an exemplary ball-valve and guide the handle of the ball valve.

In some examples, where not all ports of the channel block 100 are being used, a cap 43 may be provided, as shown in FIG. 2, shaped to plug the unused or unnecessary ports of the channel block 100.

Figure 6:
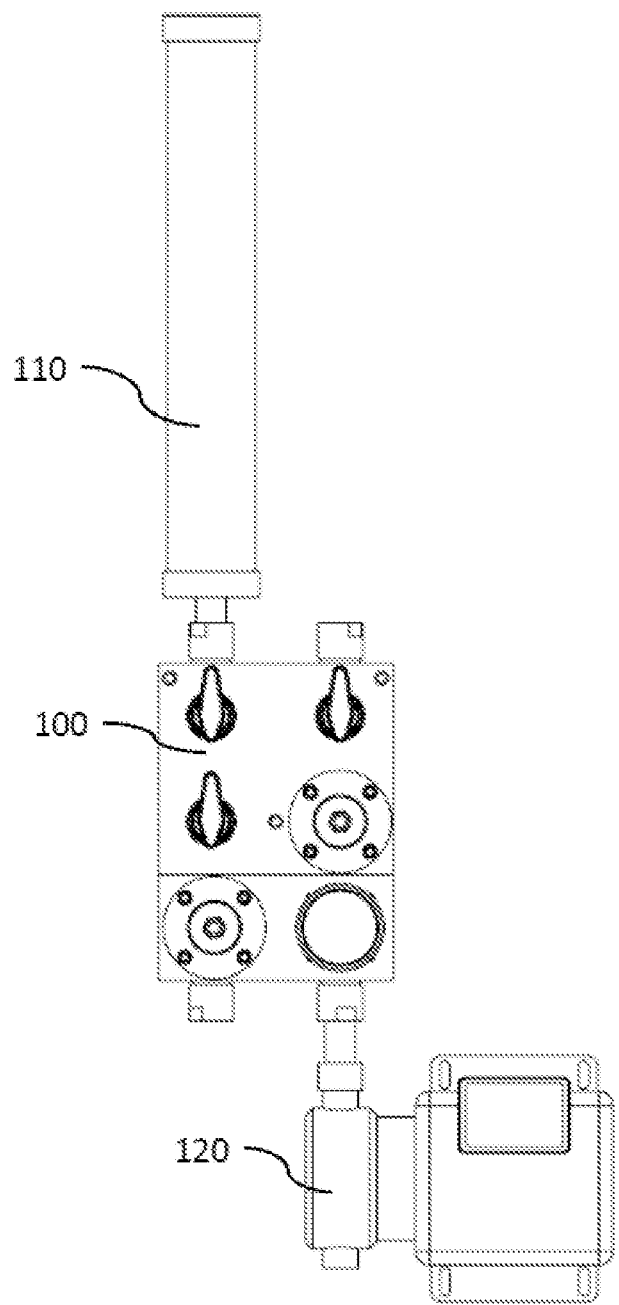
FIG. 6 is a drawing of a front view of an exemplary water treatment chemical dosing apparatus having an exemplary channel block, an exemplary calibration column, and an exemplary pump.

Reference is now made to FIG. 6, illustrating an exemplary water treatment chemical dosing apparatus having a channel block (e.g. channel block 100), connected to a pump 100 for pumping a liquid to the channel block. The water treatment chemical dosing apparatus also has a calibration column 110 connected to the channel block 100.

Figure 9A:
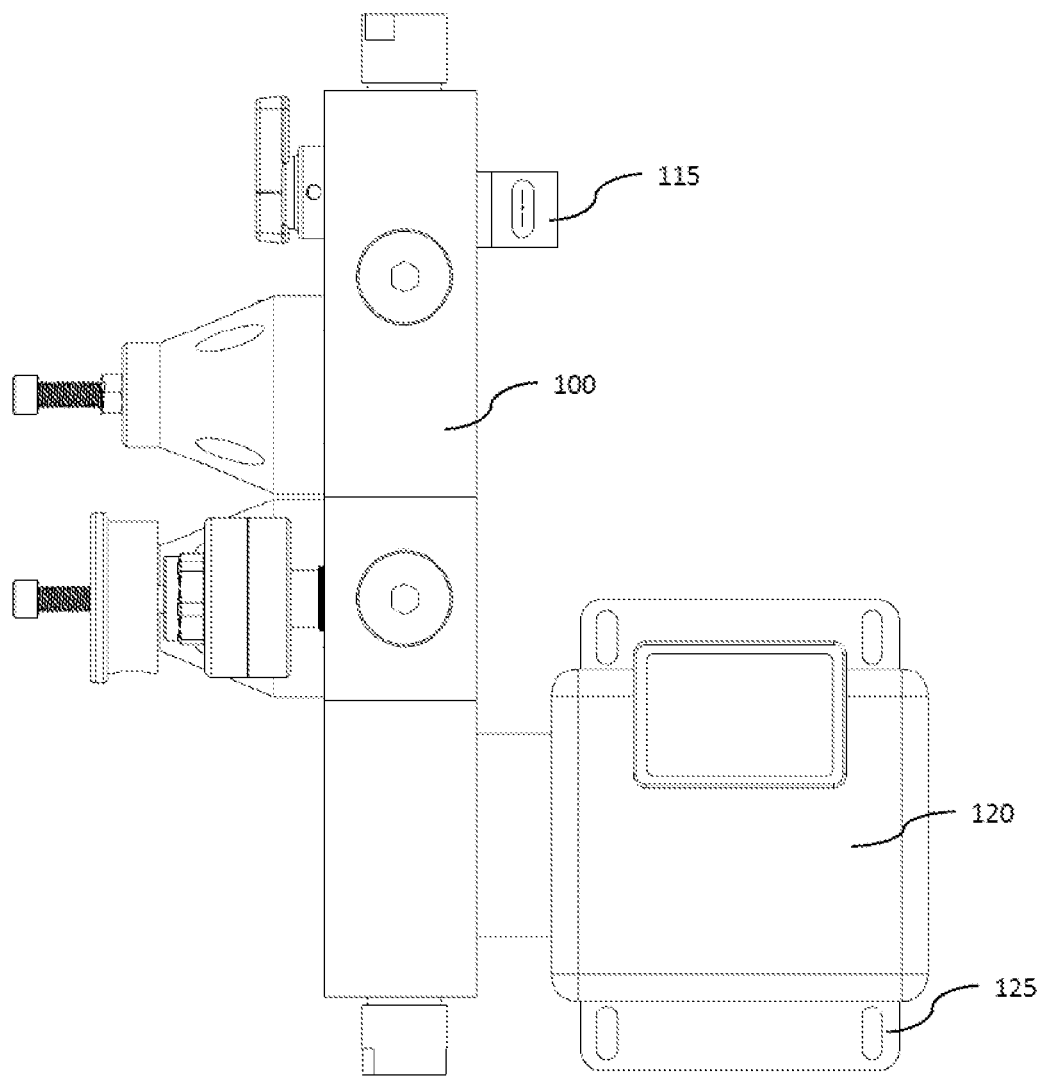
FIG. 9A is a drawing of a front-oblique view of an exemplary pump integrated to an exemplary channel block.
Figure 9B:
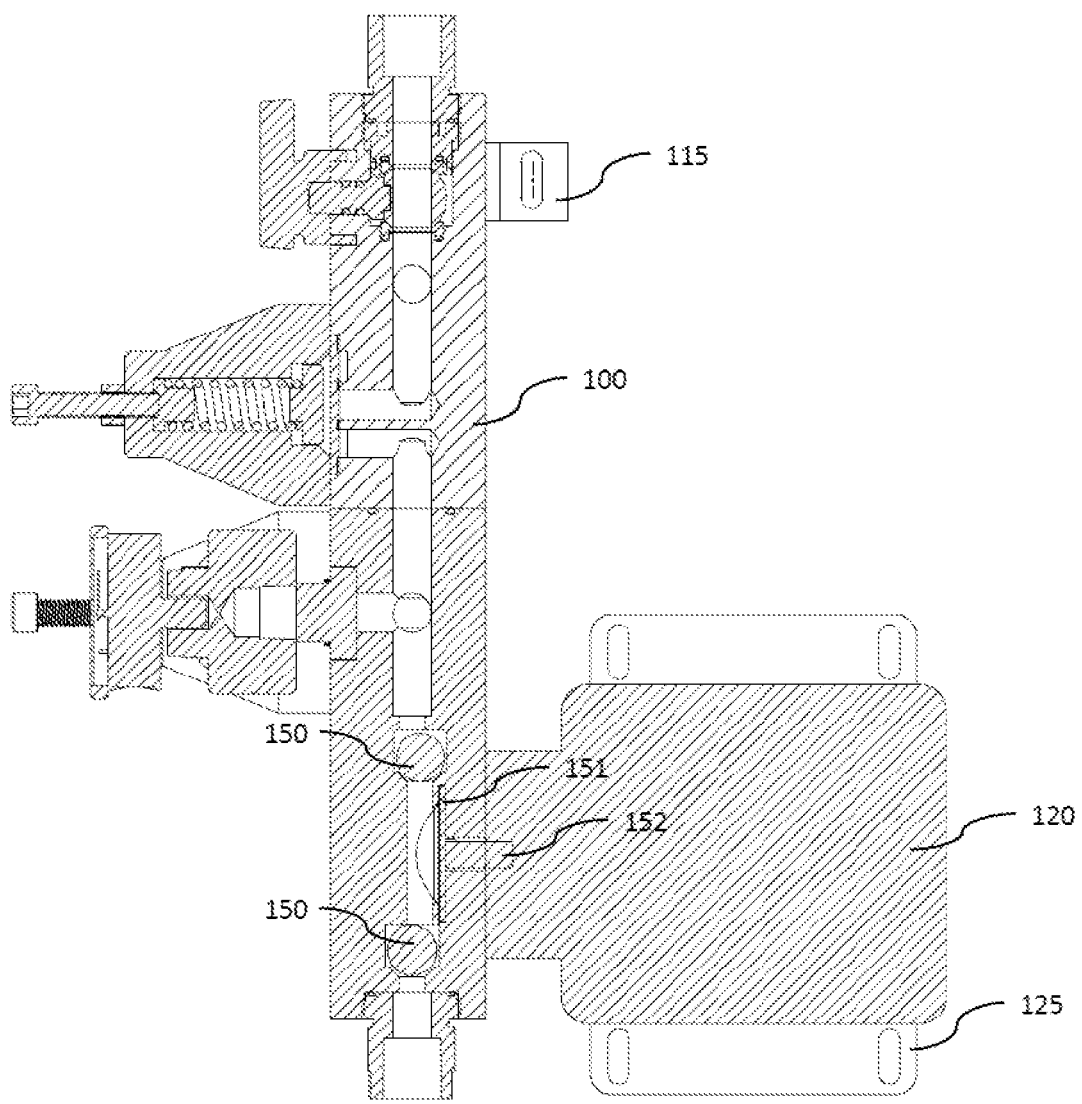
FIG. 9B is a drawing of a cross-sectional front-oblique view of an exemplary pump integrated to an exemplary channel block.
Figure 12A:
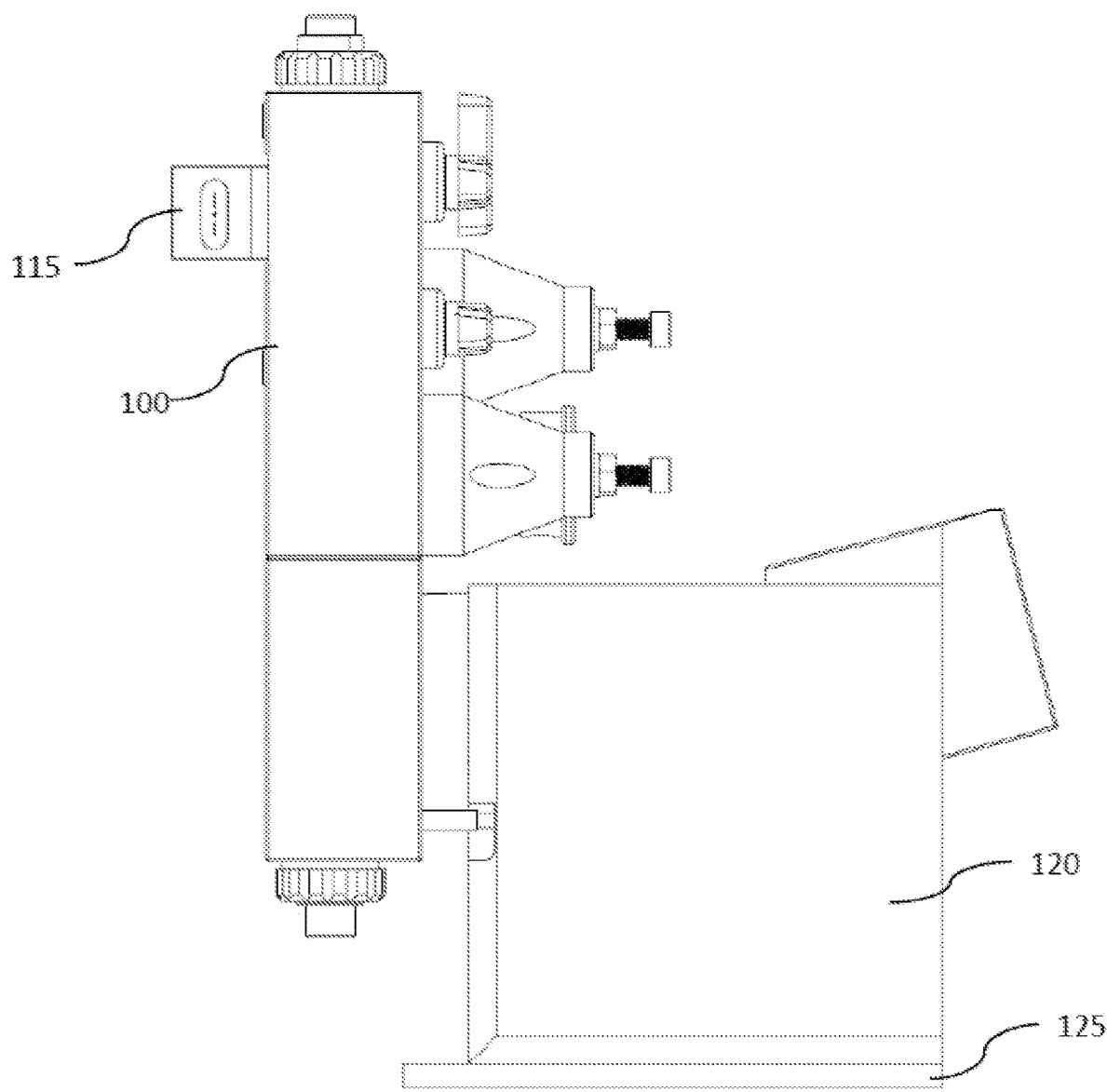
FIG. 12A is a drawing of a side view of an exemplary pump integrated to an exemplary channel block.
Figure 12B:
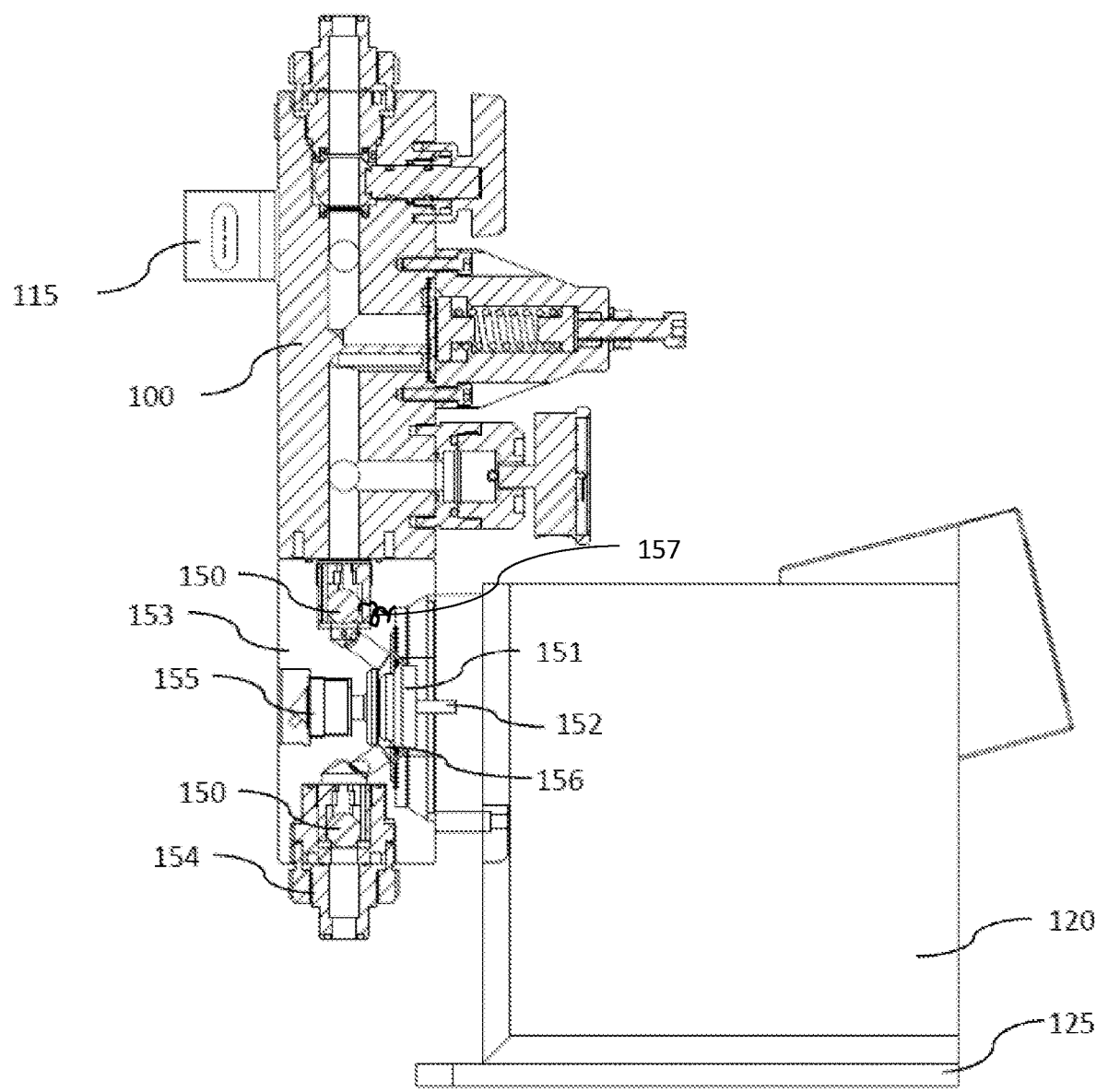
FIG. 12B is a drawing of a cross-sectional side view of an exemplary pump integrated to an exemplary channel block.

Pump Integrated to Channel Block:

Reference is made to FIGS. 9A and 9B, illustrating an exemplary pump 120 integrated to a channel block 100. Another exemplar pump 120 integrated to a channel block 100 is illustrated in FIGS. 12A and 12B.

The pump 120 may be entirely or partially integrated to the channel block 100.

The pump 120 is directly connected to the channel block 100, where there is no conduit present between the pump 120 and the channel block 100. Therefore, the chemical liquid may pass directly from the pump 120 into a channel (or channels) of the channel block 100. The pump pumps the chemical liquid directly into the channel block (without passing through a conduit to reach the channel block).

The following are non-limiting examples of pumps at least partially integrated into said channel block. In some examples, the integrated or partially integrated pump 120 (e.g. the pump head of the pump) may come into contact and be joined to a surface of the channel block 100 (e.g. the surface with the process outlet, or the surface with the chemical inlet), where the chemical liquid may flow from the pump head into a channel of the channel block 100 (e.g. through a port of the channel block 100). In other examples, a part of the integrated or partially integrated pump 120 (e.g. the pump head) may be partially incorporated into the channel block 100, where a space may be present in the channel block 100 (e.g. for receiving the pump) to which the pump 120 (e.g. the pump head) may mate. In some examples, the entire head 153 of the integrated or partially integrated pump 120 may be integrated into the channel block 100, including, e.g., the inlet and outlet of the pump, where the chemical liquid flows through the pump into a channel of the channel block (in some examples, it may flow from a channel or port of the channel block to the pump inlet, and from the pump outlet back into a channel of the channel block or towards a port of the channel block).

As shown in FIG. 9B, for an exemplary diaphragm pump 120, the check valves 150, the pump diaphragm 151 and the actuating rod 152 of the pump 120 may be integrated (or, in some examples, partially integrated), to the channel block 100, where the parts of the pump 100 are integrated into the channel block 100. As shown in FIG. 9B, one of the check valve 150 is integrated within the channel block 100 and is in communication with the chemical inlet of the channel block 100. The other check valve is in communication with a channel of the channel block 100.

In some examples, the pump 120 may cycle through suction strokes and discharge strokes. During a suction stroke the pump 120 may pull (e.g. mechanically, magnetically, etc.) on the diaphragm 151 using the actuating rod 152. By moving the diaphragm 151 out of the pump's head chamber 156, a vacuum pressure is created. This vacuum pressure results in the closing of the upper check valve 150 and allows for the introduction of new liquid into the constantly increasing volume of the pump head chamber 156. This liquid may be introduced via the inlet connector 154, then through the lower check valve 150 and into the pump head chamber 156. Once the suction stroke motion is completed, the discharge stroke may begin. In some examples, the discharge stroke may be characterised by the pump 120 pushing (e.g. mechanically, magnetically, etc.) back the diaphragm 151 into the pump's head chamber 156 using the actuating rod 152. This motion creates a positive pressure, closing the lower check valve 150 and forces the fluid into the channel block 100 through the upper check valve 150. The volume of the pump head chamber 156 decreases during the entire discharge stroke. Once the discharge stroke is done, the next suction stroke of the pump 120 may begin. The pump 120 may operate by cycling through suction strokes and discharge strokes.

In some examples, the pump head 153 may be equipped with four valves 150, two on the pump head suction (lower) side and two on the discharge (upper) side. In some embodiments, a valve 150 may be equipped with spring 157 (the valves 150 equipped with springs 157) adapted to help the check valves 150 close properly. In some examples, the pump head 153 may be equipped with a pressure transmitter 155 reading the pressure inside the pump head chamber 156. The readings obtained by the pressure transmitter 155 may be displayed or transmitted via wireless or wired connection to, e.g., a controller, allowing for controlling or monitoring the operation of the pump 120.

For illustrative purposes, exemplary pump 120 is shown as being a diaphragm pump. However, it will be understood that pump 120 may be any other pump for pumping chemical liquid through the channel block 100 without departing from the present teachings, where the pump is at least partially integrated into the channel block 100.

The pump 120 may have a mounting 125 (e.g. brackets; a stand—for example, rooted to the floor or secured to a vertical surface—on which the pump 120 is positioned; rods attaching the pump to the ceiling) for securing the pump 120 to a surface, such as a wall, the ground, a ceiling, etc. The mounting may be connected or connectable to at least one surface of the pump 125, such as a rear surface, a side surface, or its base. As the channel block 100 is integrated to the pump 120, the pump 120 provides support for the channel block 100, supporting at least in part the weight of the channel block 100.

In some examples, the channel block may also have a mounting device 115 (e.g. brackets) to secure the channel block to a vertical surface, such as a wall.

The valves located on the surface of the channel block 100 may be, in some examples, placed in the same direction as the pump 120, such that a user can access the pump and the valves from the front (as shown in FIGS. 12A and 12B).

As shown in FIG. 12B, the channel from the check valve 150 leading to the pump 120 may be angled with respect to the base of the channel block 100, and with respect to the channel leading from the pump 120 to the upper check valve 150.

Calibrating a Pressure-Relief Valve:

The pressure-relief valve 6 provides an outlet for the chemical liquid when the pressure of chemical liquid in the channels of the channel block is too great (e.g. as a result of a block), which may jeopardize the integrity of the water treatment apparatus if the liquid is not evacuated. In some examples, the pressure-relief valve 6 may be placed so that it can control the liquid flowing through the channel(s) between the chemical inlet to receive the chemical liquid (e.g. port 3) and the evacuation outlet to discharge the chemical from the channel block (e.g. port 9).

Figure 7:
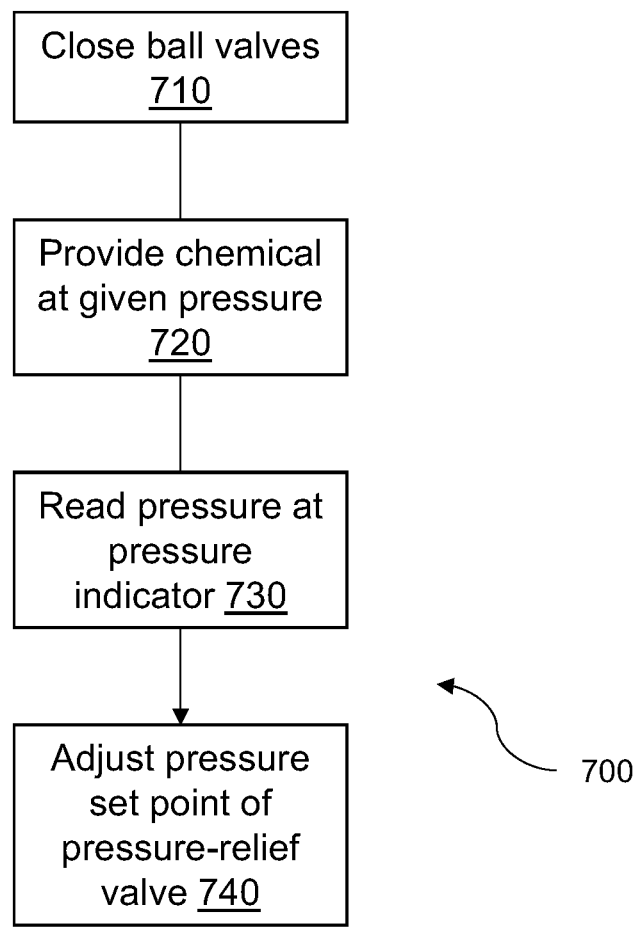
FIG. 7 is a flowchart of an exemplary method of calibrating a pressure-relief valve.

Reference is made to FIG. 7 illustrating an exemplary method 700 for calibrating a pressure-relief valve mounted to a channel block, such as channel block 100.

Ball valves 51, 52 and 53 of channel block 100 are positioned in a closed position at step 710. It will be understood that, depending upon the configuration and properties of the channel block, the number and configuration of the ball valves that are to be in a closed position may vary, where the open or closed state of the ball valves may be determined to provide a path for the chemical liquid that is to flow from the chemical inlet towards the evacuation outlet, and towards the pressure-relief valve positioned upstream of the evacuation outlet.

The chemical liquid is then provided (e.g. pumped) into the channel block through the chemical inlet at a given pressure at step 720. In some examples, the pressure of the chemical liquid may be set and/or adjusted by the pump.

The pressure of the chemical liquid is then measured at, for instance, pressure indicator 7 at step 730. The pressure may be adjusted to a given pressure at which the pressure set point of the pressure relief valve is to be set. Preferably, the pressure of the chemical liquid is provided initially at a low pressure, and gradually increased until the desired pressure is reached. It may be observed by monitoring the flow through the evacuation outlet if the chemical liquid is passing through the pressure relief valve. If chemical liquid is passing through the pressure relief valve, but the chemical liquid is allowed to pass at a pressure lower than what is sought (indicating that the pressure set point is too low), then the pressure set point can be adjusted (e.g. for a diaphragm valve, by compressing the spring using the adjustment screw) at step 740 until the desired pressure set point is reached. Similarly, it will be understood that the reverse may be performed if the pressure set point is too high.

Figure 8:
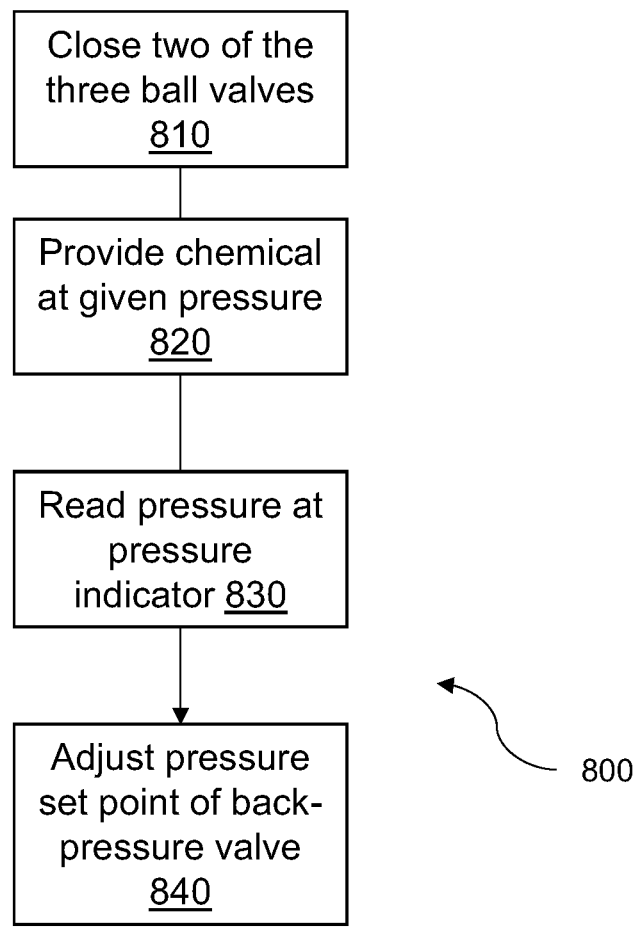
FIG. 8 is a flowchart of an exemplary method of calibrating a back-pressure valve.

Calibrating a Back-Pressure Valve:

Reference is now made to FIG. 8, illustrating an exemplary method 800 for calibrating a back-pressure valve 5. A back-pressure valve may be provided to regulate the flow of the chemical liquid passing through a channel or through channels that connect the chemical inlet to the process outlet. The back-pressure valve is placed upstream from the process outlet. The back-pressure valve may allow for the flow of the chemical liquid when the pressure of the chemical liquid is greater than a pressure set point of the back-pressure valve.

Ball valve 51 is placed in a closed position, and either ball valve 52 or ball valve 53 are placed in an open position where the other is in a closed position at step 810. It will be understood that, depending upon the configuration and properties of the channel block, the number and configuration of the ball valves that are to be in a closed position may vary, where the open or closed state of the ball valves may be determined to provide a path for the chemical liquid that is to flow from the chemical inlet towards the process outlet (and/or the calibration column outlet), and towards the back-pressure valve positioned upstream of the process outlet.

The chemical liquid is then provided (e.g. pumped) into the channel block through the chemical inlet at a given pressure at step 820. In some examples, the pressure of the chemical liquid may be set and/or adjusted by the pump.

The pressure of the chemical liquid is then measured at, for instance, pressure indicator 7 at step 830. The pressure may be adjusted to a given pressure at which level the pressure set point of the back-pressure valve is to be set. Preferably, the pressure of the chemical liquid is provided initially at a low pressure, and gradually increased until the desired pressure is reached. In some examples where the channel block has a pressure-relief valve, where the pressure-relief valve has already been calibrated, it is possible to start calibration at higher liquid chemical pressure levels, as the chemical liquid may exit, for instance, through the pressure-relief valve if the pressure of the chemical liquid is undesirably high.

It may be observed, by monitoring the flow through the process outlet, if the chemical liquid is passing through the back-pressure valve. If chemical liquid is passing through the back-pressure valve, but the chemical liquid is at a pressure lower than that which is sought, then the pressure set point can be adjusted (e.g. for a diaphragm valve, by compressing the spring using the adjustment screw) at step 840 until the desired pressure is reached. The reverse is possible if the pressure of the chemical liquid passing through the back-pressure valve is too high. In some examples, it will be understood that the pressure set point of the back-pressure valve is set at a value lower than the pressure set point of the pressure-relief valve.

In some examples, the back-pressure valve may reduce the pressure of the chemical liquid that passes therein so that the pressure of chemical liquid entering the process outlet is lowered.

Figure 10:
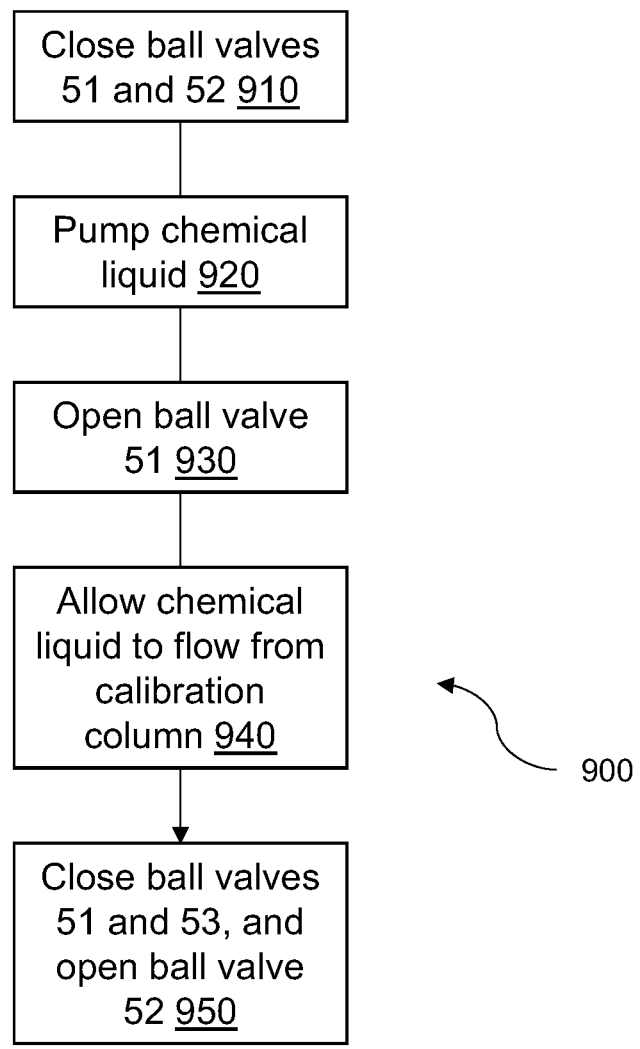
FIG. 10 is a flowchart of an exemplary method of calibrating an exemplary dosage apparatus using a calibration column.

Calibrating the Chemical Dosage Apparatus Using a Calibration Column:

Reference is now made to FIG. 10 illustrating an exemplary method 900 for calibrating an exemplary dosage apparatus using a calibration column mounted to a channel block, such as channel block 100.

Ball valves 51 and 52 are closed at step 910. Ball valve 53 leading to the calibration column is left open. It will be understood that other configurations of open/closed ball valves, depending upon the configuration or properties of the channel block, may be used in order to create a path to allow chemical liquid to flow from the chemical inlet to the calibration column without taking any other paths.

Chemical liquid is then pumped through the channel block to the calibration column at step 920. By comparing the volume that should have been pumped in reference to the pump flow set point (pump flow set point×time of pumping=volume$_{expected}$) with the volume received in the calibration column (final volume−initial volume=volume$_{received}$), the correction factor can be adjusted in the pump settings. Some pumps are equipped with a calibration feature that allows for a preset calibrating volume (no need for the calculation of pump flow set point×time of pumping). This allows for the calibration of the dosage apparatus.

Ball valve 51 is then opened at step 930. Ball valve 53 is left in an open position. Ball valve 52 is left in a closed position. It will be understood that other configurations of open/closed ball valves, depending upon the configuration or properties of the channel block, may be used in order to create a path to allow chemical liquid to flow from the calibration column to the evacuation outlet. The chemical liquid is then allowed to flow from the calibration column at step 940.

Once the chemical liquid has drained from the calibration column, ball valves 51 and 53 are closed, and ball valve 52 is opened at step 950. This allows the chemical liquid that is being pumped to flow directly from the chemical inlet to the process outlet. It will be understood that other configurations of open/closed ball valves, depending upon the configuration or properties of the channel block, may be used in order to create a path to allow chemical liquid to flow from the chemical inlet to the process outlet without taking any other paths.

Figure 11:
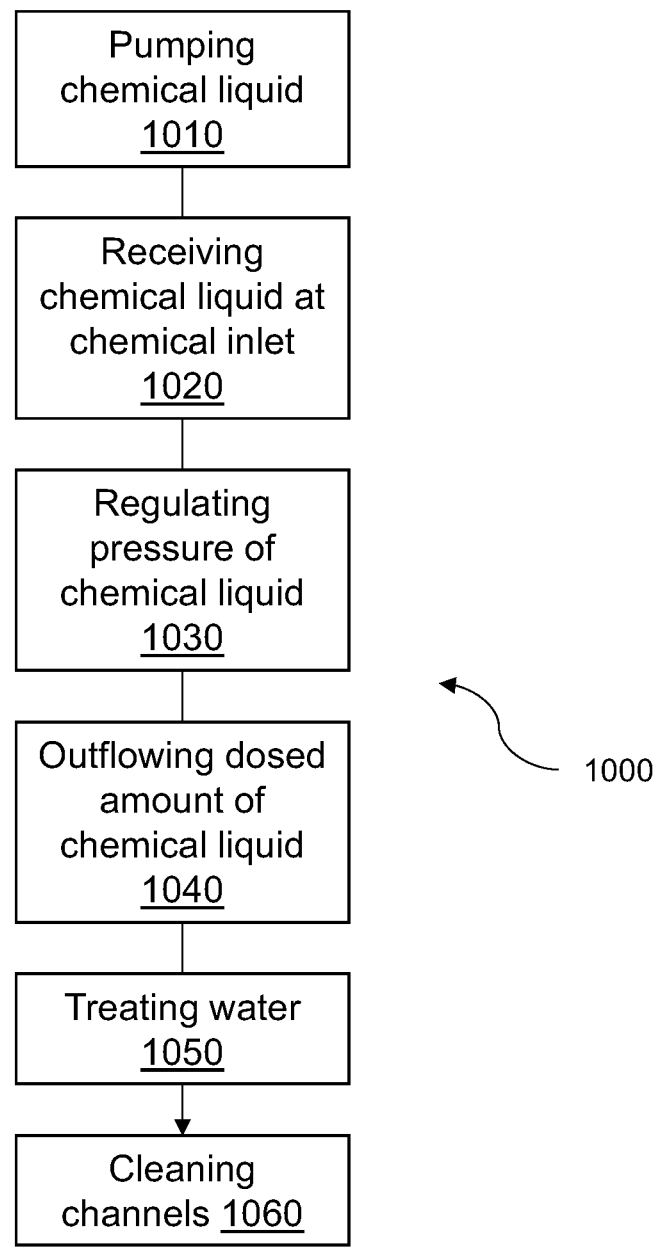
FIG. 11 is a flowchart of an exemplary method of treating untreated water using an exemplary dosage apparatus including an exemplary channel block.

Method for Performing Water Treatment:

Reference is made to FIG. 11, illustrating an exemplary method 1000 of treating a body of water with a chemical liquid using a chemical dosage apparatus having a channel block.

The regulation valves of the channel block (e.g. back-pressure valve and pressure-relief valve), as well as the dosage apparatus, may be calibrated prior to pumping chemical liquid towards the untreated body of water, the calibration performed as explained herein.

The chemical liquid is pumped (e.g. by a pump connected to a source of chemical liquid) from the source of chemical liquid at step 1010.

The chemical liquid enters the chemical inlet of the channel block at step 1020, entering the channels of the channel block. The flow through the channel block of the dosage apparatus provides for a vehicle to receive the chemical liquid that minimizes risks of leaks and spillage as the channels are integrated with the modular block(s).

The pressure of the chemical liquid is regulated within the channel block, where, for instance, a regulation valve (e.g. back-pressure valve with a given pressure set point) may be used to control the pressure of the chemical liquid that flows from the chemical inlet to the process outlet at step 1030.

A dosed amount of the chemical liquid then flows out of the channel block from its process outlet towards the water requiring treatment at step 1040.

The untreated water then receives the chemical liquid for its treatment at step 1050.

Optionally, the channels of the channel block may be cleaned periodically at step 1060. This may be to remove residue accumulating in the channels, such as crystallized or solidified chemicals. The channels may be cleaned by using the auxiliary port of the channel block.

The description of the present invention has been presented for purposes of illustration but is not intended to be exhaustive or limited to the disclosed embodiments. Many modifications and variations will be apparent to those of ordinary skill in the art.

What is claimed is:

1. A chemical dosage apparatus comprising:
   a channel block comprising:
      ports comprising at least one inlet and at least one outlet, wherein the at least one inlet comprises a liquid chemical inlet, and wherein the at least one outlet comprises a process outlet and an evacuation outlet positioned for evacuating excess chemical liquid in channels of said channel block;
      a space defined within the channel block for receiving at least a part of the pump;
      a regulation valve mounted to said channel block upstream of said evacuation outlet and interacting with said channels to control passage of said chemical liquid through a channel of said channels connecting said chemical liquid inlet to said evacuation outlet; and channels integrated within the channel block, for passing a chemical liquid, connecting the ports; and a pump at least partially integrated into the channel block, wherein at least a part of the pump that is found within the channel block is connected to the inlet of the channel block, wherein the regulation valve is located between the pump and the evacuation outlet to limit pressure of the chemical liquid in the channels of the channel block introduced by the pump, wherein the pump mates with the channel block within the space, for pumping the chemical liquid directly into the channel block.

2. The chemical dosage apparatus as defined in claim 1, wherein the channel block is configured such that the chemical liquid flows from the pump into at least one channel of the channels of the channel block, without passing through a conduit positioned between the pump and the channel block.

3. The chemical dosage apparatus as defined in claim 1, further comprising a pump mounting configured to secure the pump to a support surface, wherein the pump, secured to the support surface by the pump mounting, supports the channel block that is mounted thereon.

4. The chemical dosage apparatus as defined in claim 1, further comprising a channel block mounting for mounting the channel block to a vertical support surface, wherein the channel block is supported by at least the channel block mounting.

5. The chemical dosage apparatus as defined in claim 4, wherein the pump mounting is configured to secure the pump to the vertical support surface.

6. The chemical dosage apparatus as defined in claim 1, wherein the at least one outlet comprises a calibration column outlet, and the apparatus includes a calibration column connected to the calibration column outlet.

7. The chemical dosage apparatus as defined in claim 1, further comprising a diaphragm valve.

8. The chemical dosage apparatus as defined in claim 1, wherein the channel block comprises at least one control valve with a closed position and an opened position, wherein the at least one control valve is mounted to the channel block such that the chemical liquid flows through a channel of the channels when a control valve of the at least one control valve is in the opened position, and the chemical liquid is prevented from flowing through the channel of the channels when the control valve of the at least one control valve is in the closed position.

9. The chemical dosage apparatus as defined in claim 1, wherein the channel block comprises a pressure indicator mounted to the channel block in proximity of the chemical inlet, wherein the pressure indicator is configured to measure pressure of the chemical liquid entering the chemical inlet.

10. The chemical dosage apparatus as defined in claim 1, wherein the chemical inlet is located on a bottom surface of the channel block.

11. The chemical dosage apparatus as defined in claim 1, wherein the channel block comprises two or more sub-blocks.

12. The chemical dosage apparatus as defined in claim 1, wherein the at least one outlet includes a calibration column outlet.

13. The chemical dosage apparatus as defined in claim 12, further comprising a calibration column connected to the calibration column outlet.

14. The chemical dosage apparatus as defined in claim 1, wherein the pump is a diaphragm pump.

15. The chemical dosage apparatus as defined in claim 14, wherein the diaphragm pump comprises a pump diaphragm and an actuating rod connected to the pump diaphragm.

16. The chemical dosage apparatus as defined in claim 15, wherein the pump diaphragm and the actuating rod are at least partially integrated into the channel block.

17. The chemical dosage apparatus as defined in claim 1, wherein the channel block comprises one or more control valves positioned to regulate the chemical liquid entering from the liquid chemical inlet.

18. The chemical dosage apparatus as defined in claim 1, wherein the channel block comprises one or more control valves positioned to regulate the chemical liquid flowing in a channel positioned that directly or indirectly connects the integrated pump to the process outlet.

* * * * *